United States Patent [19]
Swihart

[11] Patent Number: 5,787,522
[45] Date of Patent: Aug. 4, 1998

[54] LIGHTWEIGHT FLIP LOUNGE

[75] Inventor: Keith L. Swihart, Goshen, Ind.

[73] Assignee: Flair Interiors Incorporated, Bristol, Ind.

[21] Appl. No.: 795,946

[22] Filed: Feb. 5, 1997

[51] Int. Cl.$^6$ .................................................. A47C 17/16
[52] U.S. Cl. ........................ 5/45; 5/43; 5/58; 5/118; 5/312
[58] Field of Search .............................. 5/45, 43, 46.1, 5/52, 118, 59.1, 58

[56] References Cited

U.S. PATENT DOCUMENTS

| | | | |
|---|---|---|---|
| 3,800,337 | 4/1974 | Mizelle | 5/43 |
| 3,986,218 | 10/1976 | Mizelle | 5/43 |
| 4,110,855 | 9/1978 | Acker | 5/45 |
| 4,123,811 | 11/1978 | Aldana | 5/43 |
| 4,292,698 | 10/1981 | Acker | 5/45 |
| 4,563,784 | 1/1986 | Shrock et al. | 5/47 |
| 4,625,347 | 12/1986 | McElmurry et al. | 5/43 |
| 4,639,953 | 2/1987 | McElmurry et al. | 5/43 |

*Primary Examiner*—Alexander Grosz
*Attorney, Agent, or Firm*— Woodard,Emhardt, Naughton,Moriarty & McNett

[57] ABSTRACT

A sofa-bed assembly in a recreational vehicle or van has a seat and a back. There is a storage space under the seat. The back can be moved in a simple roll-over action from an upright position at the rear of the seat to a horizontal, bed-forming position at the front edge of the seat. Two mounting brackets are fixed to the vehicle, one at each side of the seat. The back is connected to mounting brackets by two links on each side of the brackets and back to facilitate this action. The mounting brackets also serve to control the seat which is connected to the brackets by a pair of seat-connecting pivot links. The front ends of the pivot links are pinned to the rear ends of the mounting brackets, and the rear ends of the pivot links are pinned to the sides of the seat near the bottom rear of the seat so that, even though the back is in the bed-forming position juxtaposed with the front edge of the seat, the front edge of the seat can be lifted straight up and forward, and the rear edge of the seat rises and moves forward simultaneously, enabling further movement of the front edge upward and to the rear to place the seat in a vertical or rearwardly inclined, stable upright position, to facilitate access to the storage space without the use of props, straps, or other means to hold the seat up while accessing the space, and minimizing floor space required behind the assembly.

12 Claims, 10 Drawing Sheets

LIGHTWEIGHT FLIP LOUNGE

BACKGROUND OF THE INVENTION

1. Field of the Invention

This invention relates generally to sofa-bed assemblies, and more particularly to such assemblies for recreational vehicles and vans.

2. Description of the Prior Art

For many years, convertible sofas of lightweight construction have been employed in recreational vehicles (RV's) and vans to provide sitting accommodations during daytime, and sleeping accommodations at night. Some such arrangements have been patented.

Because of the limited available space in RV's and vans, efforts are made to maximize utilization of space. Therefore, space under seats is often used for storage. It is usually desirable to enclose the space under seats in order that the stored items remain securely in place, particularly during travel. Access to such space can be provided by tilting up the seat about hinges in the back, such as in U.S. Pat. No. 4,110,855 issued to Acker on Sept. 5, 1978. Another approach is to provide a drawer in the front, as in U.S. Pat. No. 4,625,347 issued Dec. 2, 1986 to McElmurry et al. That patent also discloses the option of tilting the seat upward and to the rear about the hinge 24 for access to the space under the seat.

Both of the aforementioned patents show a relatively convenient way to move the back of the sofa from an upright position at the rear of the seat to a horizontal position in front of the seat, by means of a linkage accomplishing a roll-over motion of the back as it is moved from the rear of the seat to the front of the seat to convert from a seating unit to a bed unit.

Due to a strip 70 on the front of the seat section in the Acker patent, it is not possible to raise the seat for access to storage after the back has been placed in the bed-forming position shown in FIGS. 2 and 6 in the Acker patent. But in the McElmurry device, it appears to be possible to raise the seat for access to storage even though the back is in the bed-forming position, as shown in FIG. 6. But the disadvantage of this construction is the fact that the rear edge of the seat must be spaced away from the wall of the vehicle to allow room for the seat to tilt backward when raised about the hinge 24. Moreover, if it is desired to be able to leave the seat unattended in the vertical position while items are removed from or replaced in the storage area, the wall behind the unit must be totally unobstructed the entire height that the seat will occupy when in the vertical position. Also, the hinge axis must be far enough out from the wall that the center of gravity of the seat assembly will be above a point between the axis and the wall, preferably closer to the wall. Otherwise, support straps or poles or other means are necessary to hold the seat up, if both hands of the user are to be free to access the storage space. Considering the limited space in RV's and vans, this can be a significant disadvantage. It mandates the use of more floor area for the sofa-bed assembly. The present invention addresses these problems.

SUMMARY OF THE INVENTION

Described briefly, according to a typical embodiment of the present invention, a sofa-bed assembly is provided with a seat and a back wherein the back can be moved from a vertical position at the rear of the seat to a horizontal position at the front edge of the seat in a simple roll-over action. The back is connected to mounting brackets by two links on each side of the back to facilitate this action. The mounting brackets also serve to support the seat which is connected to the brackets by a pair of links. The links are arranged so that, even if the back is in the bed-forming position juxtaposed with the front edge of the seat, the front edge of the seat can be lifted and pulled forward and, simultaneously, the rear edge of the seat rises and moves forward. This enables the front edge to be lifted further to place the seat in a stable upright position, to facilitate access to the storage space without the need to use props, straps or to manually hold the seat up while accessing the space.

DESCRIPTION OF THE PREFERRED EMBODIMENT

Figure 1:
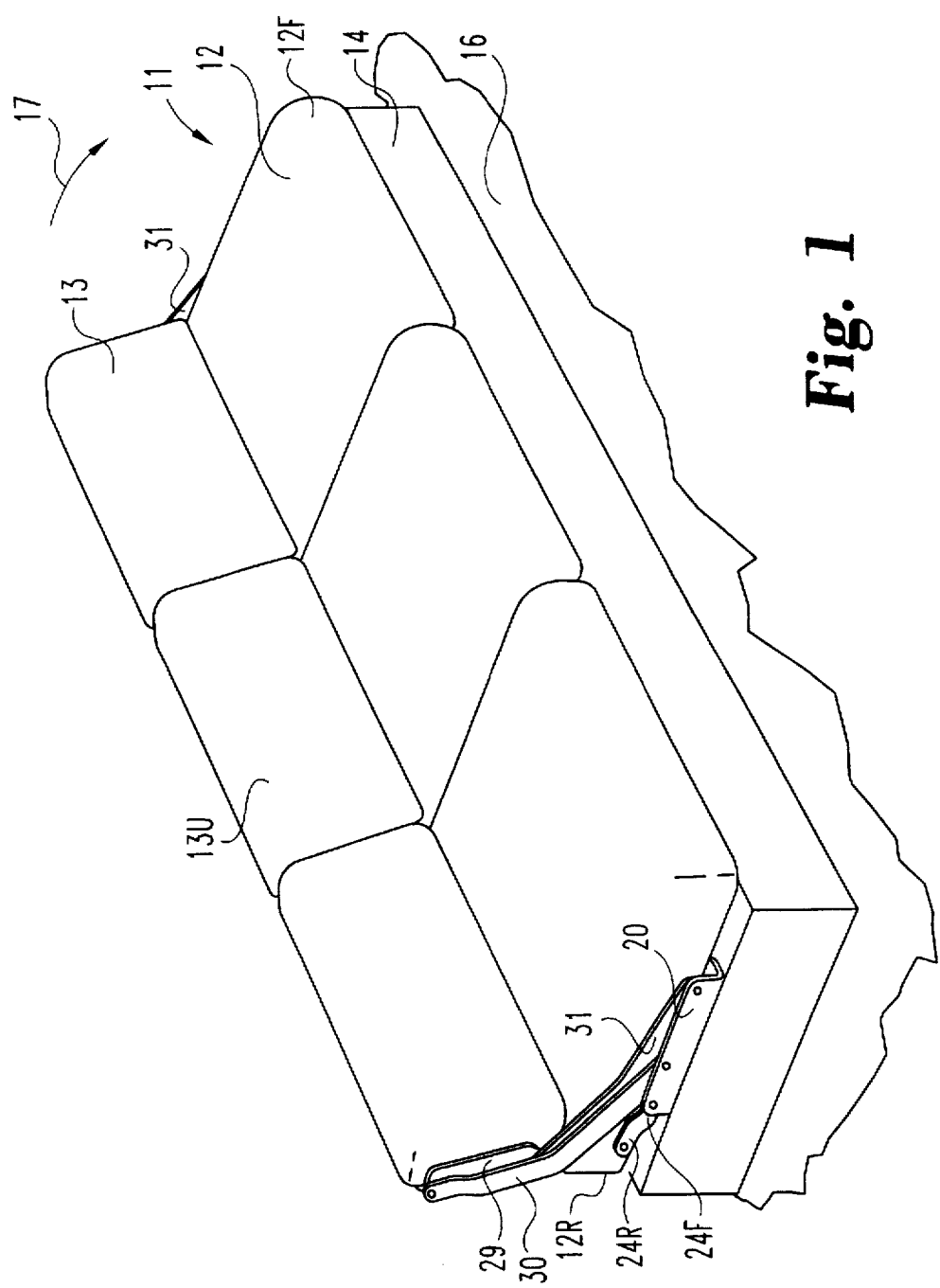
FIG. 1 is a front perspective view of a lightweight flip lounge according to a typical embodiment of the present invention.
Figure 2:
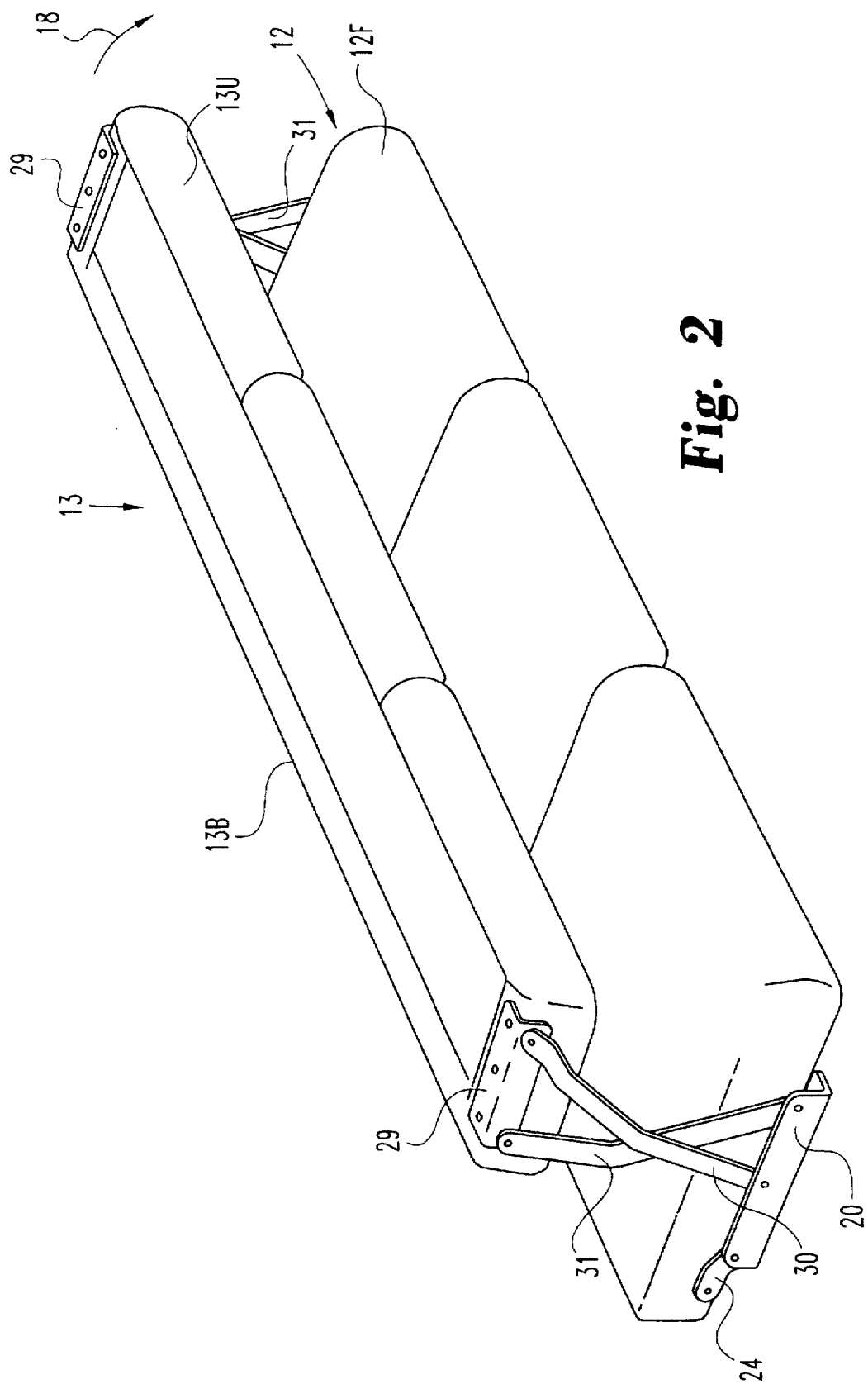
FIG. 2 is a front perspective view thereof with the back being flipped over and forward toward the bed-forming position.
Figure 3:
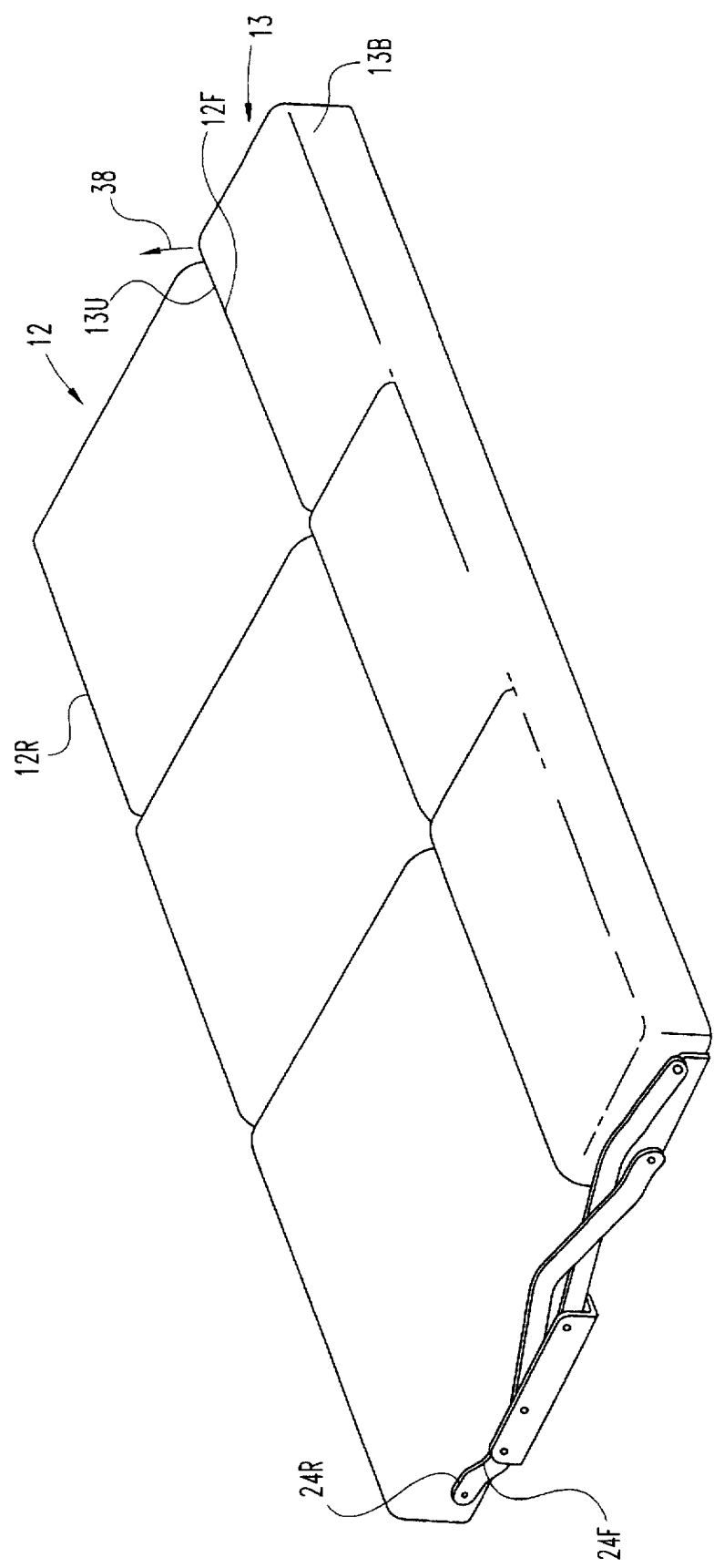
FIG. 3 is a perspective view of the assembly with the back juxtaposed with the seat in the bed-forming position.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 4:
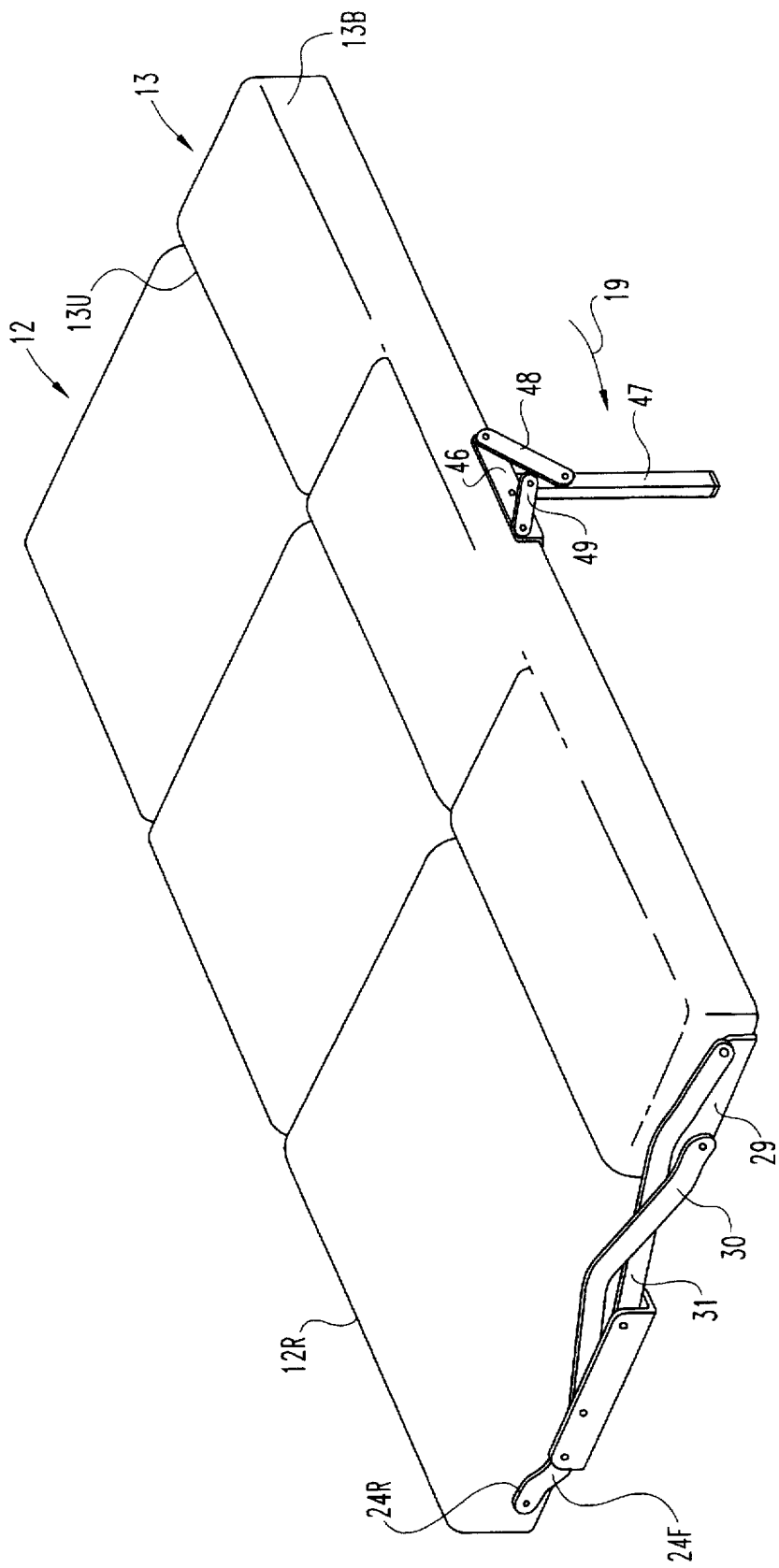
FIG. 4 is a perspective view like FIG. 3 but with a support leg in position supporting the lowered back.
Figure 5:
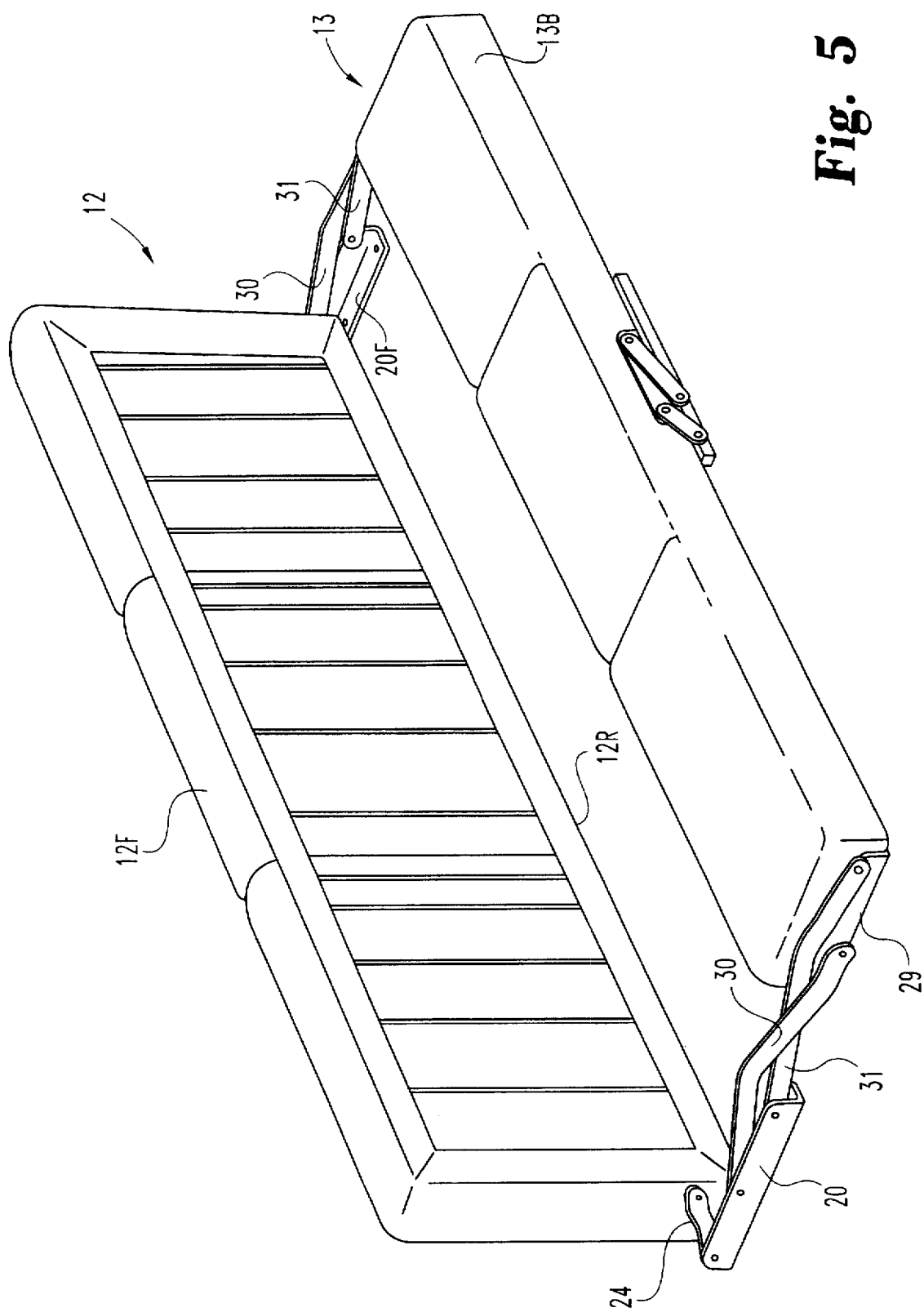
FIG. 5 is a perspective view showing the seat raised and providing access to storage space under it.
Figure 6:
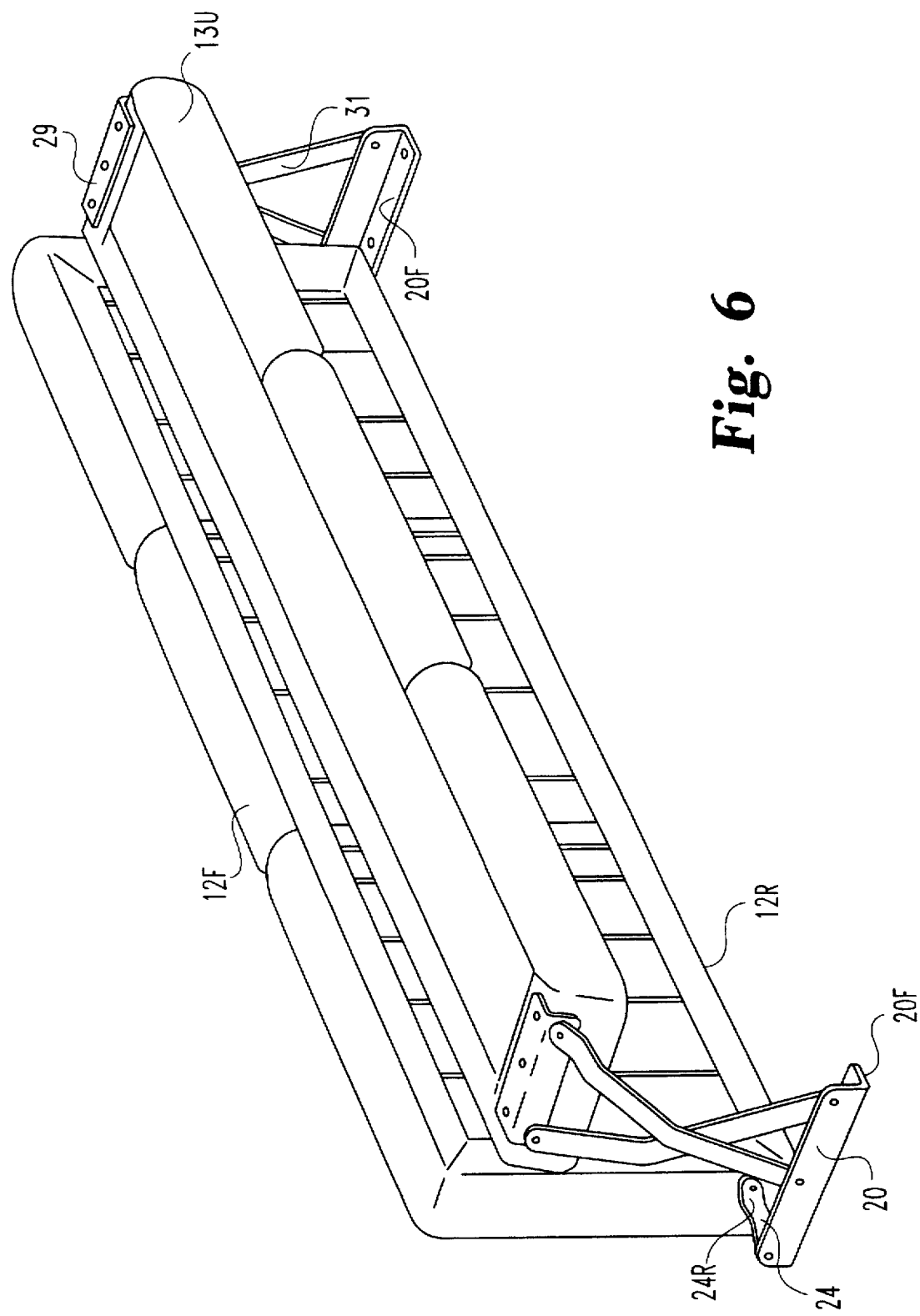
FIG. 6 is a perspective view showing the seat and back raised for even more access to the storage space.

Referring now to the drawings in detail and particularly FIGS. 1 through 4, the sofa-bed assembly 11 includes a seat assembly 12 and a back assembly 13 mounted on a storage compartment 14 mounted on the floor 16 of an RV or van. In the illustrated example, the seat assembly is one unit which includes a framework, support members, padding, tufting or stitching and appropriate cover, which may be of conventional construction. The back assembly is constructed similarly. In FIGS. 2 through 6, the storage unit 14 is omitted to simplify the illustration. While the unit is shown in the sofa or lounge configuration in FIG. 1, it may be readily converted to the bed configuration by pulling the back assembly 13 forward in the direction of arrow 17 up to the position shown in FIG. 2 and then downward in the direction of arrow 18 in FIG. 2 to the horizontal, bed-position shown in FIG. 3. Then the leg assembly 19 is folded down, as shown in FIG. 4, to support the outer edge of the back assembly 13. Hinge and link assemblies are provided at each side of the seat and back assemblies enabling this movement and action of the back so that it is flipped over during movement from the vertical position shown in FIG. 1, to the horizontal position shown in FIGS. 3 and 4.

Figure 7:
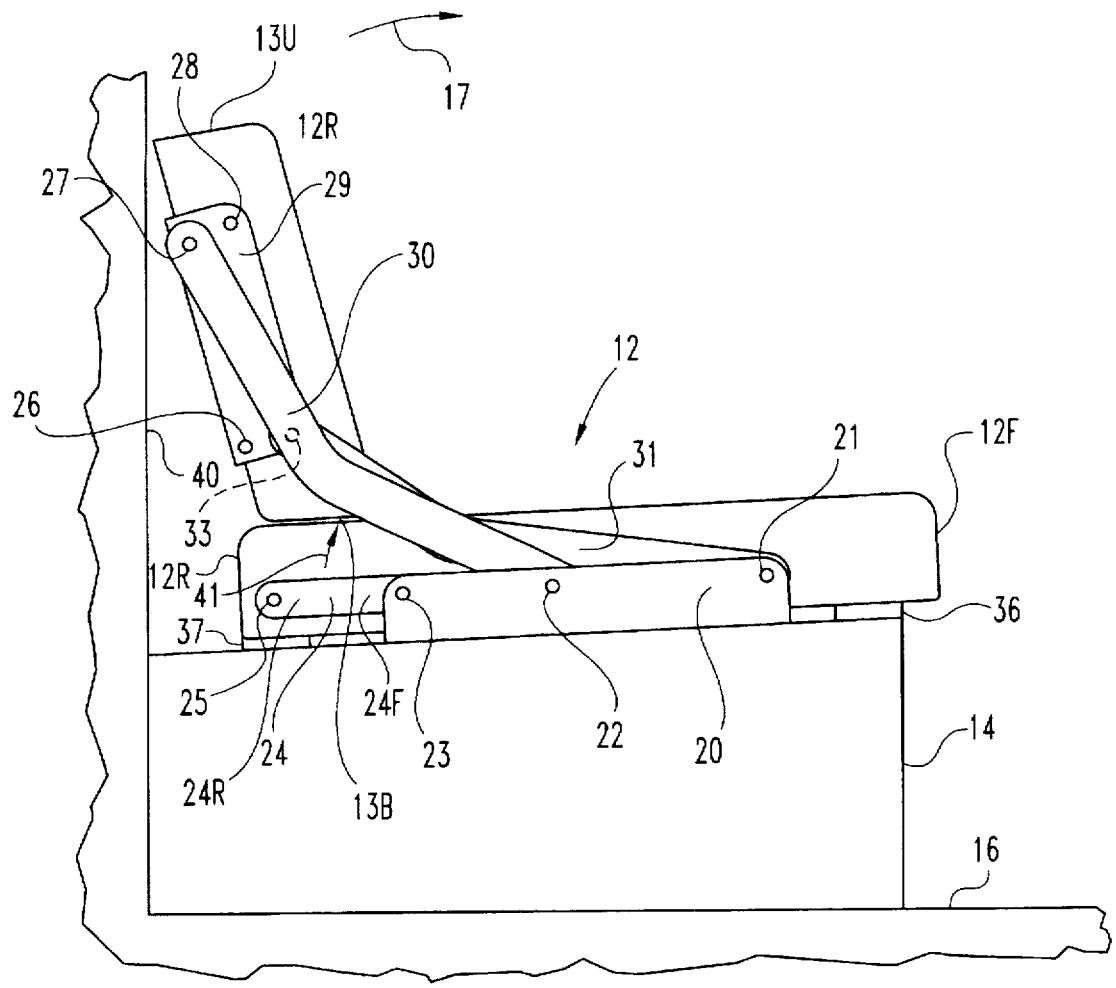
FIG. 7 is a side elevational view of the assembly in the normal sofa position.
Figure 9:
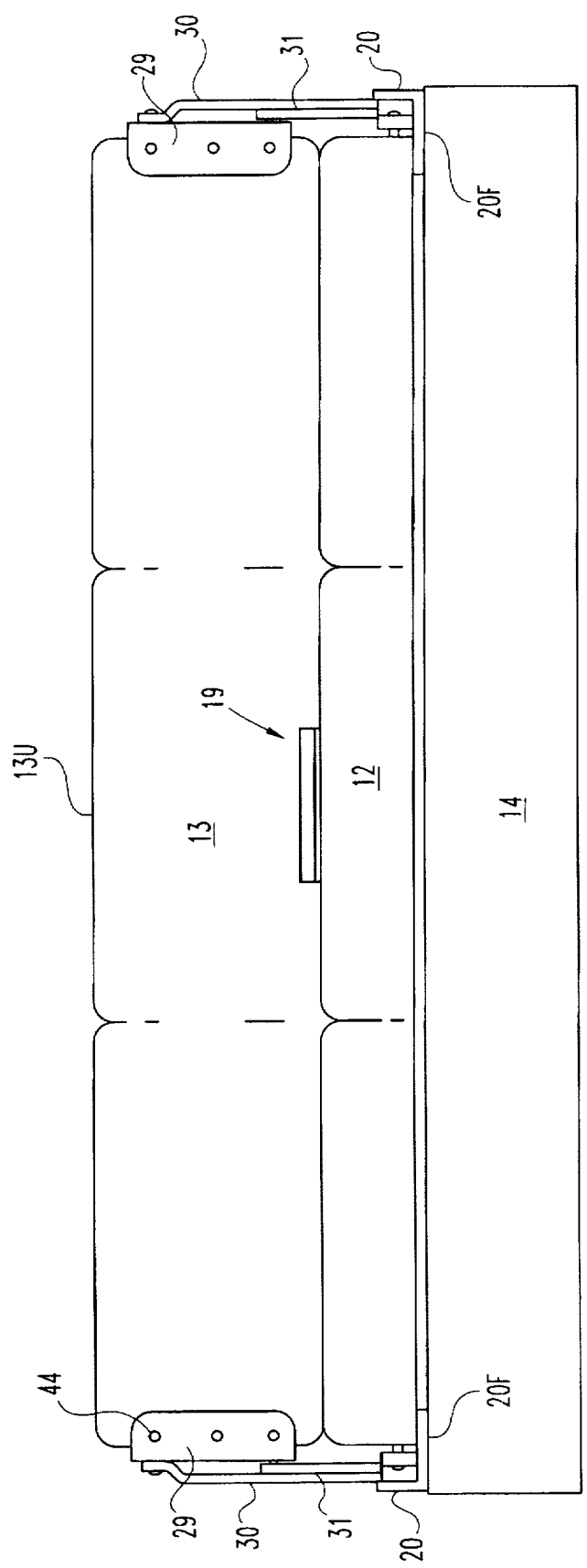
FIG. 9 is a rear elevational view of the assembly in the sofa condition.

The hinge and link assemblies include various features which will now be described. Referring now specifically to FIG. 7 along with the previously-mentioned figures, the mechanism enabling the operation of the lounge will now be described. The mechanism on one side of the lounge is a mirror image of that on the other side, so a description of one should suffice for both. More specifically, it includes a base hinge bracket 20 with hinge pins 21, 22 and 23 mounted in it. A pivot link 24 is hinged to the pin 23 and has a hinge pin 25 at its rear end. Pin 25 and its counterpart on the opposite side of the seat 12, are the only actual connections of the seat to the assembly. However, as shown in FIG. 9, when the seat is in the normal lounge position, the bottom of the seat rests at its edges on the in-turned flanges of the brackets 22. Further support for the seat across its width at both the front and the rear edges may be provided by rails on the top of the storage chest 14, which provides a base support for the base hinge brackets 20.

Support for the back assembly 13 is provided by a couple of back hinge brackets that are shaped similarly to the base hinge brackets but somewhat smaller and which have stop pins 26 and 28 and hinge pin 27 affixed thereon. The back hinge bracket 29 is pivotally connected by hinge pin 27 to the link 30 at the upper end of the link. The lower end of the link is hinged to the base hinge bracket 20 at hinge pin 22. A forward link 31 whose front end is hinged to the base hinge bracket 20 at hinge pin 21 has its rear end connected to the back hinge bracket 29 at hinge pin 33 hidden behind link 30 in FIG. 7 but shown in FIG. 8. As shown in FIGS. 1–6 and 9, the links are bent appropriately so that they can freely pass each other as the back is moved from the position shown in FIGS. 1 and 7, to the position shown in FIG. 3, where the upper edge 13U of the back cushion is juxtaposed with the front edge 12F of the seat cushion to provide a flat, essentially horizontal surface from the rear edge 12R of the seat cushion to the lower edge 13B of the back cushion which is now at the front of the unit. Whether or not the unit is precisely horizontal depends primarily on the respective elevations of the support rails 36 and 37 on the storage unit 14 at the front and rear edges of the seat. Of course, it is desirable that the horizontal flange of the base hinge brackets 20 be disposed consistent with the support line between the front and rear support rails 36 and 37 to maximize support of the frame inside the seat assembly 12 at all times when the seat is down for sitting or sleeping.

When the back is in the upright position shown in FIGS. 1 and 7 for seating purposes, the lower edge 13B rests atop the seat cushion. As it is pulled up and forward and lowered to bed position, and vice versa, the stop pins 26 and 28 are in position to engage respectively, the links 30 and 31 to prevent inadvertent rolling of the back in the incorrect direction. While the roll-over back feature of the lounge is operationally similar to those known in the art, the seat operation is different and will be described now.

Figure 8:
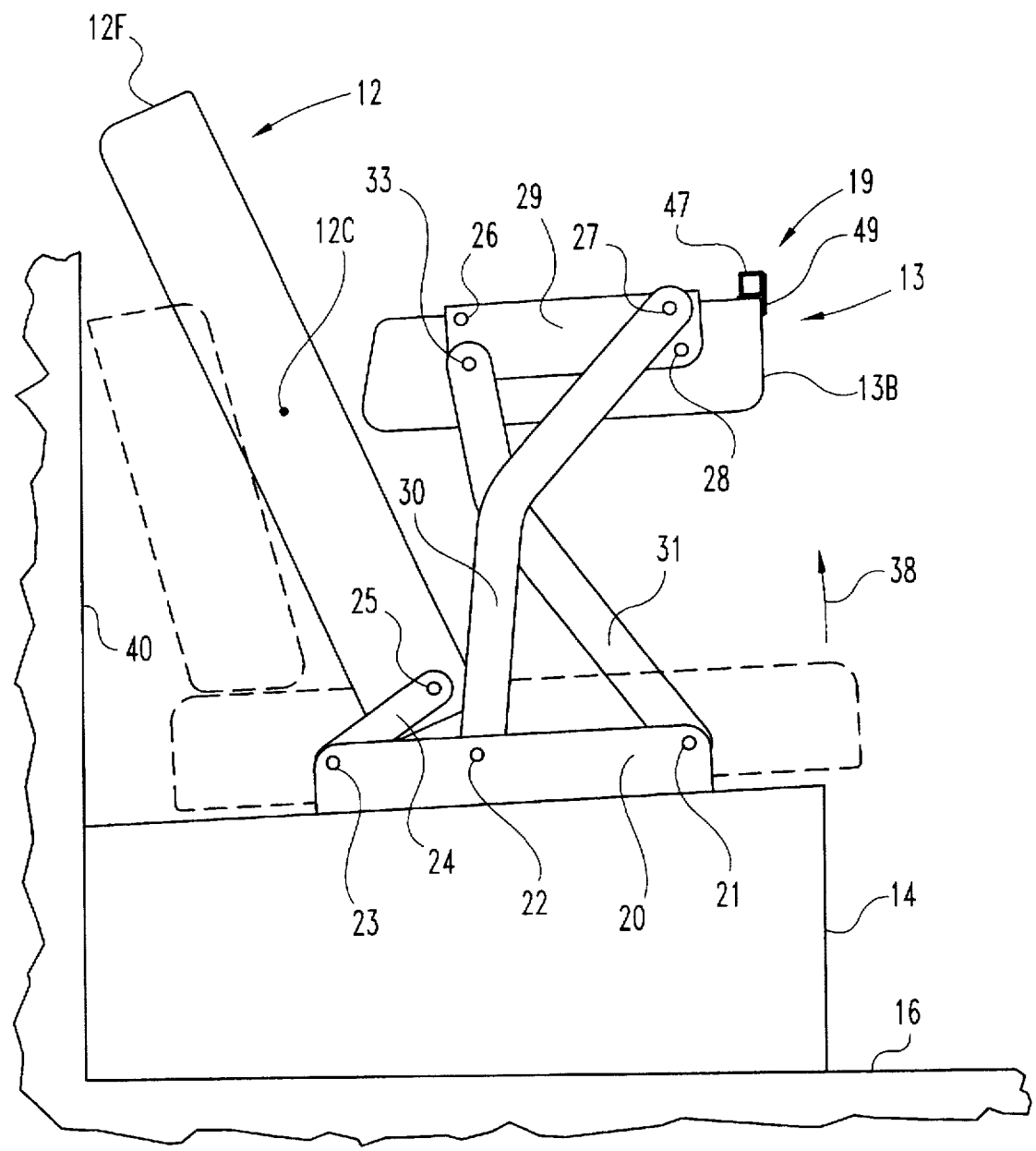
FIG. 8 is a side elevational view of the assembly in the condition shown in FIG. 6.

As mentioned above, in the Acker patent, it is not possible to raise the seat when the back has been rolled-over into the bed position. In the McElmurry et al. patent, it is possible to raise the seat for access to storage space under the seat when the back in the bed position, but it requires significant space behind the hinge in order to accommodate the pivoting of the cushion at the back as the front of the seat is being raised. Additional space is required if the seat is to be leaned back against the wall to remain upright during access to the storage space. Otherwise some kind of holding bracket, strap or prop or other means would be necessary to hold the seat up and free-up both hands of the individual accessing the storage space. According to the present invention, the seat may be raised without either of these problems. The provision of the pivot link 24 at each side of the seat, according to the present invention, enables lifting straight up at the front of the seat in the direction of arrow 38 in FIGS. 3 and 8 when the back 13 is in the horizontal, bed-forming position shown in FIG. 3 without any portion of the seat moving backward toward the wall 40. This is possible because the seat is pinned to the pivot links 24 near the rear edge 12R of the seat at each side of the seat and at the rear end of the links. Consequently, the link can pivot upward and forward in the clockwise direction of arrow 41 (FIG. 7) to whatever extent is convenient for the user to raise the seat and tilt it back to the position such as shown in FIG. 8, for example, for convenient access to the interior of the storage compartment 14. Also, if the back is down in the position shown in FIG. 5, the seat can be lowered about the hinge pin 23 from the position shown in FIG. 8 until the cushion rests at its ends on the in-turned bottom flange such as 20F (FIG. 9) of the base hinge brackets. It can rest there until the user has removed whatever is desired from the storage compartment, or replace whatever is desired into the storage compartment. It is not necessary to use any props or anything of the like, and the front edge 12F of the seat cushion can be simply leaned against the wall 40, as the center of gravity of the seat assembly at 12C is now behind both of the pivot pins (hinges) 23 and 25. Thus, the seat will remain in place until the user desires to return it to the normal sitting position shown by the dotted lines in FIG. 8 and by the solid lines in FIGS. 1, 2, 3 and 4. Another feature is that, if desired, the back can be moved up from the position shown in FIGS. 3–5 to the position shown in FIGS. 6 and 8 for closer access to the storage space in compartment 14.

The horizontal and inward offset of the rear portion 24R of the pivot links, with respect to the forward portion 24F thereof (FIGS. 1, 3 and 4), enables the seat to be moved down to rest on the horizontal flange 20F of each of the base hinge brackets as it permits clearance between the pivot link 24 and the back connector link 30.

Each of the two back hinge brackets 29 is connected to the frame of the back assembly 13 by screws such as 44 (FIG. 9) in three places. The base hinge brackets 20 are not connected to the seat but, instead, are connected similarly to the storage compartment structure by fasteners (not shown) down through the base flanges 20F of these brackets into the storage compartment frame. The storage compartment can be made of metal, wood or plastic, for example, with bolts or lag screws through the base hinge brackets into the frame. Except for the nature and location of the mounting of the seat assembly, its structure can be conventional as can the structure of the back.

Figure 10:
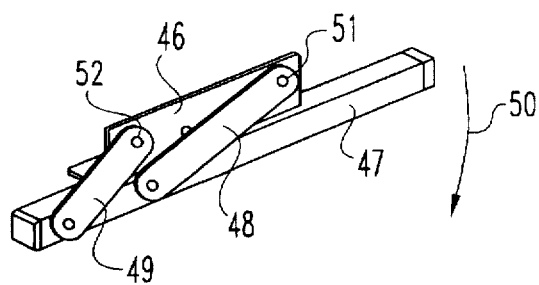
FIGS. 10, 11 and 12 show the support leg operating sequence from the folded position to the open and supporting position, as in FIG. 4.
Figure 11:
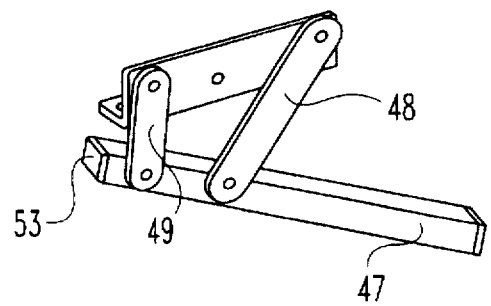
Figure 12:
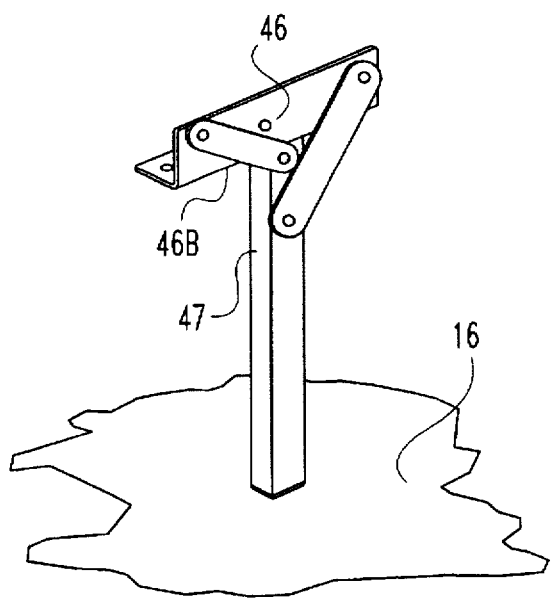

For the support leg of FIG. 4, an additional bracket 46 is provided and is of an angular cross-section similar to brackets 20 and 29. It is fastened to the back of the back assembly, typically by three screws (not shown). It includes the folding leg 47 and two links 48 and 49. When the seat back assembly 13 is moved to or past the position shown in FIG. 2, for example, toward the bed-forming position of FIGS. 3 and 4, the leg 47 can be pulled in the direction of arrow 50 (FIG. 10) whereupon the links 48 and 49 swing down about their pivot axes 51 and 52, respectively, as shown in FIG. 11 until the end 53 of the leg 47 is in position to abut the bottom 46B of the flange 46, whereupon it can then support the leg between the floor 16 and the back above the floor 16.

It should be evident from the foregoing that the present invention enables a lounge to be convertible to a bed, but enable access to the storage compartment under the seat in an easy way without requiring extra space in the vehicle compartment and without the necessity for using props or straps or other means to hold the seat out of the way while access is made to the storage compartment.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A convertible roll-over back sofa-bed assembly comprising:

a base;

a seat linked to the base and having a front edge and a rear edge;

a back linked to the base and having a top-forming edge and a bottom-forming edge, the bottom forming edge being normally disposed adjacent the seat rear edge;

the back linkage being arranged to enable movement of the back from normal back rest position to bed-forming position with the said top-forming edge being juxtaposed with the front edge of the seat; and the seat linkage being arranged to enable lifting the front edge of the seat from said juxtaposition, for access to space under the seat without rearward horizontal displacement of the rear edge of the seat.

2. The assembly of claim 1 and wherein:

the base is an angle member having a horizontal portion extending under the seat from one side of the seat, and the angle member having a vertical portion beside the seat, the vertical portion having a front end and a rear end; and a link is pivotally connected to the vertical portion near the rear end to provide a hinge axis and the link extends rearwardly from the hinge axis and is pivotally connected to the side of the seat near the rear edge of the seat whereby the seat is linked to the base.

3. The assembly of claim 2 and wherein:

the link has a front end and a rear end, the link being pivotally connected to the vertical portion near the front end of the link, the link being pivotally connected to the side of the seat near the rear end of the link, the rear end of the link being movable upwardly and forwardly about the hinge axis on the angle member to a point ahead of the rear end of the vertical portion whereby the rear edge of the seat can be rested on the horizontal portion of the base while the seat is raised to rest in an upright position for access to the space without manually holding the seat in the upright position.

4. A convertible sofa-bed assembly comprising:

a base;

a seat linked to the base and having a front edge and a rear edge and a bottom;

a base support structure providing a storage space under the seat;

a back connected to the base and having a top-forming edge and a bottom-forming edge, the bottom forming edge being normally located adjacent the seat rear edge;

the back being arranged to enable movement of the back from a normal back-resting position to bed-forming position with one of the said edges being in juxtaposition with the front edge of the seat; and the seat linkage being arranged to enable lifting the front edge of the seat from said juxtaposition, with accompanying upward and forward horizontal displacement of the rear edge of the seat, for access to the space under the seat.

5. The assembly of claim 4 and wherein:

the base is a hinge bracket;

a pivot link is pivotally connected to the hinge bracket to provide a first pivot hinge axis, and the link extends rearwardly from the first pivot hinge axis and is pivotally connected to the seat near the rear edge of the seat to provide a second pivot hinge axis, whereby the seat is linked to the base.

6. The assembly of claim 5 and wherein:

the second pivot hinge axis is normally located rearward from the first pivot hinge axis when the seat is in a first normal lounge position; and the second pivot hinge axis is movable upward and forward about the first pivot hinge axis to a position in front of a vertical projection of the first pivot hinge axis when the front edge of the seat is lifted from said juxtaposition.

7. The assembly of claim 5 and wherein:

the pivot hinge bracket has a front end and a rear end; and the link is pivotally connected to the bracket near the rear end of the bracket to provide the first pivot hinge axis.

8. The assembly of claim 7 and wherein:

the link has a front end and a rear end, the link being hinged to the bracket near the front end of the link, the link being hinged to the seat near the rear end of the link, the rear end of the link being movable upwardly and forwardly about the first pivot hinge axis to a point ahead of the rear end of the bracket whereby the rear edge of the seat can be rested beside the hinge bracket when the seat is raised to rest in an upright position for access to the space without manually holding the seat in the upright position.

9. The assembly of claim 7 and wherein:

link has a front end and a rear end;

the link is hinged to the hinge bracket near the front end of the link;

the link is hinged to the seat near the rear end of the link;

the seat has a center of gravity;

the rear end of the link is movable upwardly and forwardly about the first pivot hinge axis to locate the second pivot hinge axis ahead of a vertical projection of the first pivot hinge axis while the center of gravity is located behind a vertical projection of the second pivot hinge axis, enabling stable resting of the seat in an upright position without manually holding the seat in the upright position, during access to the space.

10. In a vehicle compartment having a floor and a wall extending upward from the floor, the sofa-bed assembly of claim 4 and wherein:

the seat has two sides;

the top-forming edge of the back is adjacent the wall;

the base support structure is mounted on the floor under the seat;

the base is a pivot hinge bracket is mounted to the structure at one side of the seat;

a second base is a hinge bracket mounted to the structure at the other side of the seat;

the seat linkage has rear ends and front ends;

the seat linkage being hinged to the pivot hinge brackets near the front ends of the linkage, and the seat linkage being hinged to the seat near the rear ends of the linkage; and the seat linkage being arranged to enable lifting the front edge of the seat from said juxtaposition, with accompanying upward and forward horizontal displacement of the rear edge of the seat in a direction away from the wall, for access to the space under the seat.

11. The combination of claim 10 and wherein:

the back is connected to the hinge brackets by links for roll-over movement of the back from the back-resting position to the bed-forming position.

12. The combination of claim 11 and wherein:

the seat linkage comprises two pivot links, one at each side of the seat, the pivot links having horizontal offsets to provide clearance for the back connecting links during relative movements of the seat and the back.

* * * * *